(12) United States Patent
Chapman

(10) Patent No.: US 8,555,219 B2
(45) Date of Patent: Oct. 8, 2013

(54) IDENTIFYING HIERARCHICAL CHIP DESIGN INTELLECTUAL PROPERTY THROUGH DIGESTS

(75) Inventor: David Chapman, San Jose, CA (US)

(73) Assignee: Oasis Tooling, Inc., Alamo, CA (US)

( * ) Notice: Subject to any disclaimer, the term of this patent is extended or adjusted under 35 U.S.C. 154(b) by 0 days.

(21) Appl. No.: 13/492,630

(22) Filed: Jun. 8, 2012

(65) Prior Publication Data

US 2012/0317525 A1     Dec. 13, 2012

Related U.S. Application Data

(60) Provisional application No. 61/495,903, filed on Jun. 10, 2011, provisional application No. 61/657,474, filed on Jun. 8, 2012.

(51) Int. Cl.
*G06F 17/50* (2006.01)
*G06F 9/455* (2006.01)

(52) U.S. Cl.
USPC ............................ 716/107; 716/106; 716/111

(58) Field of Classification Search
USPC ................................................ 716/106, 111
See application file for complete search history.

(56) References Cited

U.S. PATENT DOCUMENTS

| 8,266,571 | B2 * | 9/2012 | Chapman et al. | ............ | 716/136 |
| 2002/0023097 | A1 | 2/2002 | Ripley | | |
| 2004/0199880 | A1 | 10/2004 | Kresh et al. | | |
| 2004/0249830 | A1 | 12/2004 | Sonkin et al. | | |
| 2009/0307639 | A1 | 12/2009 | Chapman et al. | | |

FOREIGN PATENT DOCUMENTS

| KR | 10-2011-0039256 | 4/2011 |
| WO | 2009/152249 A2 | 12/2009 |
| WO | 2012/170939 A2 | 12/2012 |

OTHER PUBLICATIONS

International Search Report and Written Opinion of International Application No. PCT/US2012/041737, mailed Feb. 18, 2013, pp. 1-11.

\* cited by examiner

*Primary Examiner* — Stacy Whitmore
*Assistant Examiner* — Magid Dimyan
(74) *Attorney, Agent, or Firm* — Haynes Beffel & Wolfeld LLP; Ernest J. Beffel, Jr.

(57) ABSTRACT

One method implementation disclosed includes detecting matching leaf cells that are functionally identical (optionally, functionally similar) and assigning matching names for the matching leaf cells to replace original, non-matching names. Optionally, digests can be calculated for the leaf cells and used to detect similarities and/or differences. The matching names are propagated to at least some higher-level cells in the hierarchical design, in place of the original names. The method can further include calculating digests for at least some of the higher level cells after the propagating of the matching names into the higher level cells. Various design matching technologies can be used in combination with cell renaming and new name propagation, not limited to use of digests. Dependency chains can be calculated to improve propagation of names through the hierarchy.

21 Claims, 5 Drawing Sheets

IDENTIFYING HIERARCHICAL CHIP DESIGN INTELLECTUAL PROPERTY THROUGH DIGESTS

RELATED APPLICATIONS

This application is related to and claims the benefit of U.S. Provisional Patent Application No. 61/495,903, titled "IDENTIFYING HIERARCHICAL CHIP DESIGN INTELLECTUAL PROPERTY THROUGH DIGESTS", filed 10 Jun. 2011. This application is also related to and claims the benefit of U.S. Provisional Patent Application No. 61/657,474, titled "IDENTIFYING HIERARCHICAL CHIP DESIGN INTELLECTUAL PROPERTY THROUGH DIGESTS", filed 8 Jun. 2012. The provisional applications are incorporated by reference.

BACKGROUND

1. Field of Disclosure

The technology disclosed improves on U.S. Pat. No. 7,685,545, which is hereby incorporated by reference. The new technology involves renaming at least some cells in a hierarchical design of a circuit so that cells with matching functions or forms have matching names. New cell names, after renaming, are propagated upward through at least some levels of the design hierarchy. Optionally, cells that appear to be derivative or based on small changes also can be given matching names.

2. Prior Disclosure and New Opportunity

The '545 patent describes the advantages of identifying and comparing chip design intellectual property using digests of design data rather than the design data itself. The technology disclosed made it possible to identify, for example, altered copies of intellectual property within a large chip design file in a polygon-based layout format such as GDSII or OASIS without discarding potentially functionally relevant data or flattening the design. In particular, that patent showed how to identify copies of design units (also known as cells) using digests even when their names change.

The technology disclosed in the '545 patent detects changes in names of cells embedded within other cells and makes it practical to identify and focus on such changes. However, the '545 patent did not fully address sources of noise in reporting changes that relate to production scale designs. By noise, we mean reports of changes that do not assist a designer in understanding the scope and impact of functional design changes.

In practice, typical design files contain many thousands of cells, and there are many duplicate cells. Even hierarchical cells may be duplicated, and cell names may be changed at all levels of the design hierarchy. These non-functional changes introduce noise into the analysis process. An opportunity arises to further define and discriminate among changes that are detected.

SUMMARY

Figure 1:
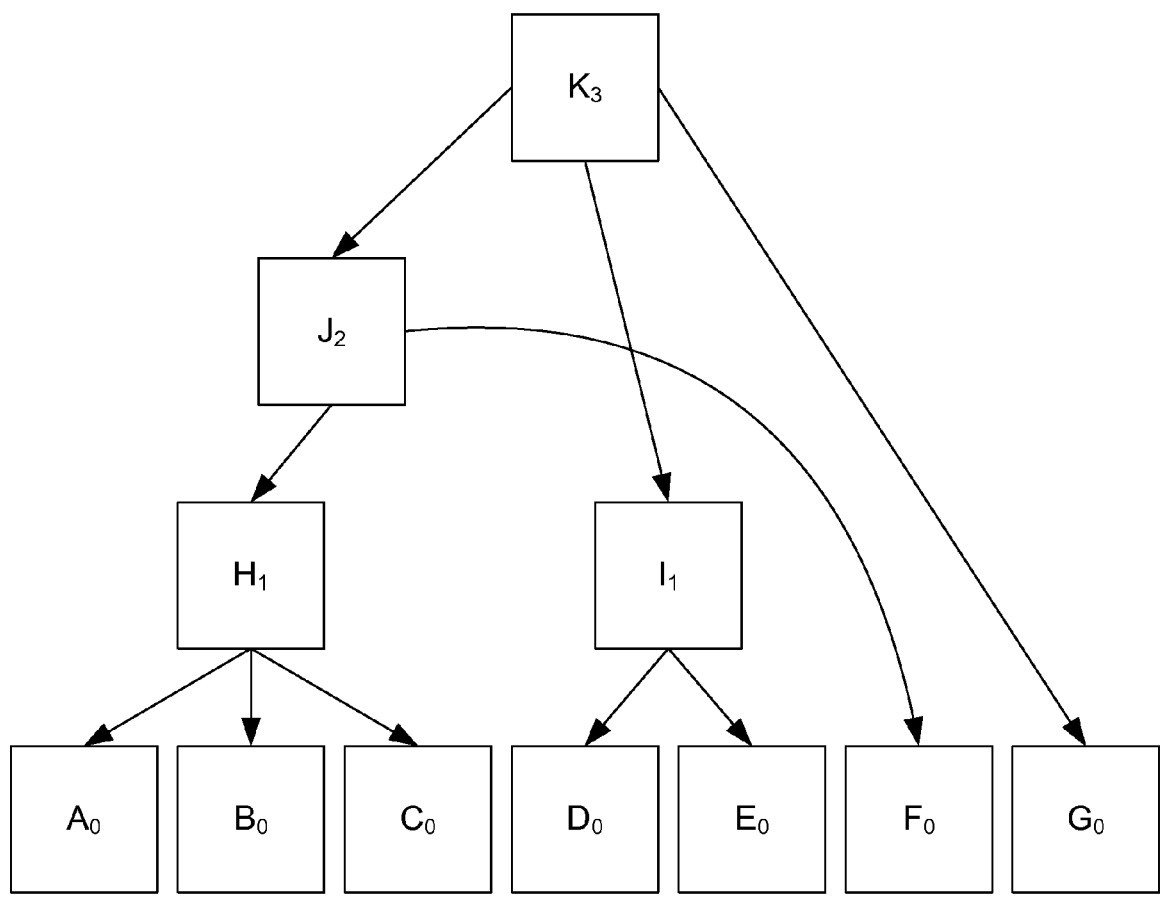
FIG. 1 depicts a sample hierarchical design that can compute digests of level 0 cells in parallel, then digests of level 1 cells in parallel, then the digest of level 2 cells in parallel (in this example, only one), then the digest of the level 3 cell.

Computer-implemented methods are described that improve on evaluating the similarities between cells used in a hierarchical design of a circuit device.

One method implementation disclosed includes detecting matching leaf cells that are functionally identical (optionally, functionally similar) and assigning matching names for the matching leaf cells to replace original, non-matching names. Optionally, digests can be calculated for the leaf cells and used to detect similarities and/or differences. The matching names are propagated to at least some higher-level cells in the hierarchical design, in place of the original names. The method can further include calculating digests for at least some of the higher level cells after propagation of the matching names into the higher level cells. Various design matching technologies can be used in combination with cell renaming and new name propagation, and not just limited to use of digests. Dependency chains can be calculated to improve propagation of names through the hierarchy. Particular aspects of the technology disclosed are described in the claims, specification and drawings.

DETAILED DESCRIPTION

Renaming cells is a normal part of combining IP from multiple sources into an overall, hierarchical design. A weakness in the prior technology is that renaming of cells propagates non-functional name changes upward through the design hierarchy. The technology disclosed addresses the noise caused by the upward propagation of non-functional name changes in cells. By noise, we mean reports of changes that do not assist a designer in understanding the scope and impact of functional design changes. The technology disclosed optionally combines so-called speculative matching of similar cells with matching of functionally identical cells. After applying matching names to cells that match, new cell names are propagated upwards through at least some levels of the design hierarchy. With matching names in place for matching functions or forms, the functional aspects of cells in the design can be matched to functional aspects of reference cells, such as cells in libraries, to identify renamed cells.

Unique names, whether canonical or not, are assigned to all cells, so that functionally identical but renamed cells receive matching names. Therefore, when digests or signatures are calculated for upper level cells in the design hierarchy, non-functional renaming of cells no longer causes digest differences. A change in the cell name of a leaf cell at the base of the design hierarchy is not propagated upward as changed digests or signatures to higher levels of the hierarchy that depend on the names of cells at the base and intermediate levels. This source of non-functional name change-related noise is reduced or eliminated. The new technology allows the system to classify name changes or to filter out non-functional name changes altogether.

Modern "Systems on Chips" (SoCs) incorporate multiple functional units on a single silicon die, often from different design groups or even from outside vendors. These are generally referred to as "Intellectual Property" (IP). Intellectual property blocks are often packaged as standalone design files that incorporate all referenced lower-level cells. This allows the IP blocks to be shipped as fully validated units, even if the cells they contain are duplicates of other cells in the SoC into which the IP is incorporated.

As an overall design file is assembled, cells incorporated into units of the design are often renamed. While it is logically possible to find the functionally matching cells, then rename them so that they have matching names, and remove duplicate cells (redirecting references to the renamed/removed cell copies), this does not happen in practice. For instance, a company or vendor may have a policy that prohibits the modification and/or renaming of an IP block after that block has been finalized.

For example, there could be three different processor cores in a cell phone chip: one to control the display, one to process still or video images, and one to process radio signal data sent to or received from a cell phone tower. Each of these processors may reference the same basic, lowest level "leaf" cells from the foundry fabricating the chip. The design file for each processor core will often include a copy of all of the leaf cells used in that processor core, with the result that the overall SoC design file may have three copies of many leaf cells that have been reused in the processor cores.

Design files are hierarchical. A hierarchical design contains multiple cells, each describing a functional or structural portion of the design. Some higher-level cells represent groupings of other cells and are not solely functional. Repeated instances of cells within the design are used by reference, rather than by copying lower-level cell design data repeatedly into the higher-level cells. This reduces the size of the design file, the computation required to resolve the design and the risk of bit errors during copying.

A typical reference to a lower-level cell includes some parameterization, such as a placement specification. In a polygon-based description of a chip design layout, a placement specification may include an offset along the X and/or Y axes of the plane, a mirroring of data about one or both axes, and/or a rotation about some reference point.

A reference to a lower-level cell also includes the name or other unique identifier (e.g., a number) for the lower-level cell. Because there may be thousands of cells in a design and it is essential to use the proper cell each time, a digest that uniquely characterizes a higher-level cell is constructed from references to lower-level cells and generally includes the names of every referenced cell as well as the parameterization. Otherwise the digest could not distinguish between a reference to an improper cell and a reference to the proper cell in the same location.

There are no industry-wide rules for how cells are renamed when a design block is incorporated into an SoC. From the perspective of an analysis tool, different names assigned to functionally duplicate cells are essentially arbitrary. Full matching of all levels of a hierarchical IP block thus faces a conflict: matching of the names of leaf cells and lower-level hierarchical cells is necessary to match the higher-level hierarchical cells, but matching is impossible to guarantee because cells may be duplicated and renamed arbitrarily.

The technology disclosed includes assigning matching names to cells that have functionally matching functions or forms. These names are canonical, in the sense that they are systematically created, or at least they are unique names.

At the leaf or zeroth level of the hierarchy the digest or signature calculated for a cell, as described in the '545 patent, does not include (is not based on) the name of the cell. Because the cell digest does not depend on the cell name, it is possible to match leaf cells in a design file against stored digests even when the leaf cells have been renamed. This allows unique names to be assigned to unique leaf cells and matching names to be assigned to matching leaf cells. Every cell can be assigned a system-generated name, such as a name that relates to the computed digest or signature.

While it might be possible to retain some of the original cell names and rename only matching cells to match first-processed original cell names, this would complicate the order of processing. If the names of earliest processed cells were retained, and only later processed matching cells were renamed, processing results would depend on the order in which cells were processed.

Renaming all leaf cells or at least all non-unique (matching) leaf cells facilitates upward propagation of canonical cell names 380, 390. Renaming of leaf cells can optionally be combined with digest generation or with matching cell identification. Either digests or another matching technology can be used to identify matching cells. The digest technology is described in the '545 patent. When canonical digests are calculated for leaf cells, canonical names can be generated, for instance using the digest value as all or part of the canonical name. This method of name generation could produce matching names for functionally matching cells, irrespective of names assigned by designers. In some implementations, exact matching is extended to speculative matching 370, in which matching names are assigned to cells that are analytically considered to be derivatives of one another. For instance, two cells include the same plurality of layers; all but one layer match between the cells; the two cells are considered functionally similar for the purposes of hierarchical comparison and can be assigned matching names.

With matching names applied to matching leaf cells and those names propagated upward in the hierarchical design, first-level cells that include only design information and references to leaf or zeroth level cells produce digests that are independent of leaf cell renaming. After applying cell renaming to leaf cells, the system can compute or re-compute digests for the first-level hierarchical cells that have references limited to only leaf cells. Digests generated using canonical leaf cell names improve matching among first-level hierarchical cells. First-level hierarchical cells that differ only because they reference two functionally identical leaf cells that have different names will now produce matching digest values. Matching unique, optionally canonical, names are then applied to matching first-level hierarchical cells.

Figure 4:
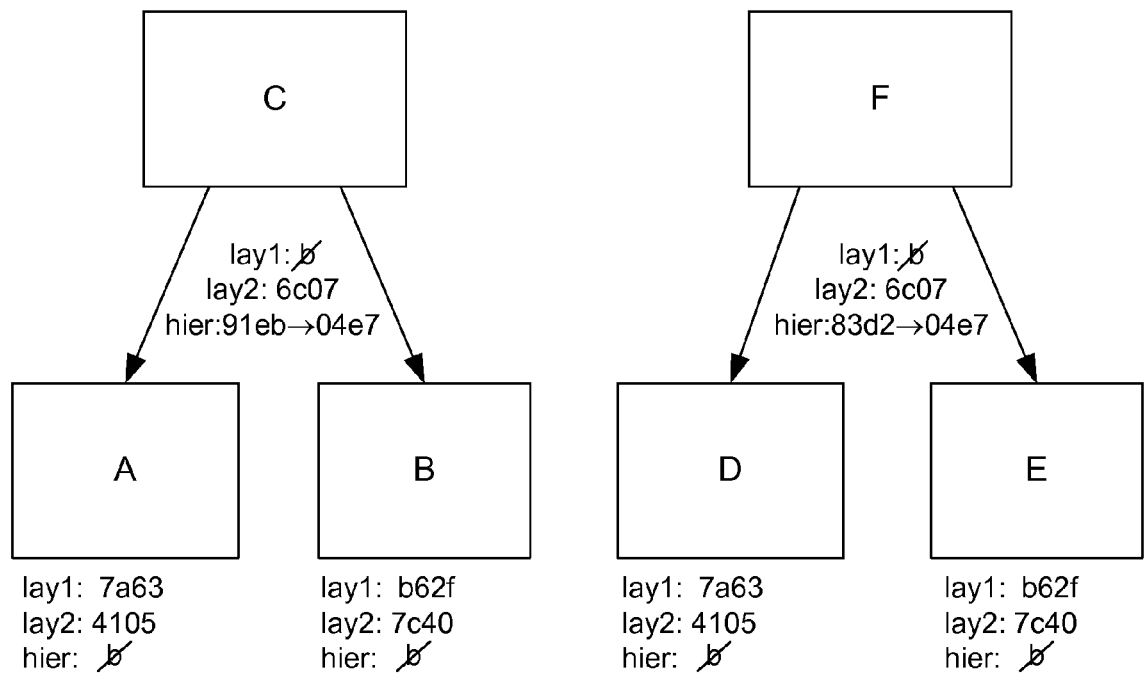
FIG. 4 depicts a bottom-up digest computation, where digests for hierarchical cells C and F change when canonical cell names or cells A, B, D, and E are used; this allows matching of cells C and F.

FIG. 4 depicts a bottom-up digest computation, where digests for hierarchical cells C and F change when canonical cell names for cells A, B, D, and E are used; this allows matching of cells C and F. In the figure, all four leaf cells, A, B, D and E have layers 1 and 2. Cells A and D match, so their canonical names do as well. Cells B and E also match, so their canonical names do as well. As a result of using canonical cell names for cells A and D, and canonical cell names for cells B and E, the digests for hierarchical data within cells C and F change. Previously the hierarchical data digest within cell C was 91eb; as a result of using canonical cell names, it changes to 04e7. Previously the hierarchical data digest within cell F was 83d2; as a result of using canonical cell names, it changes to 04e7. Now it can be seen that cell C and cell F match.

Figure 3:
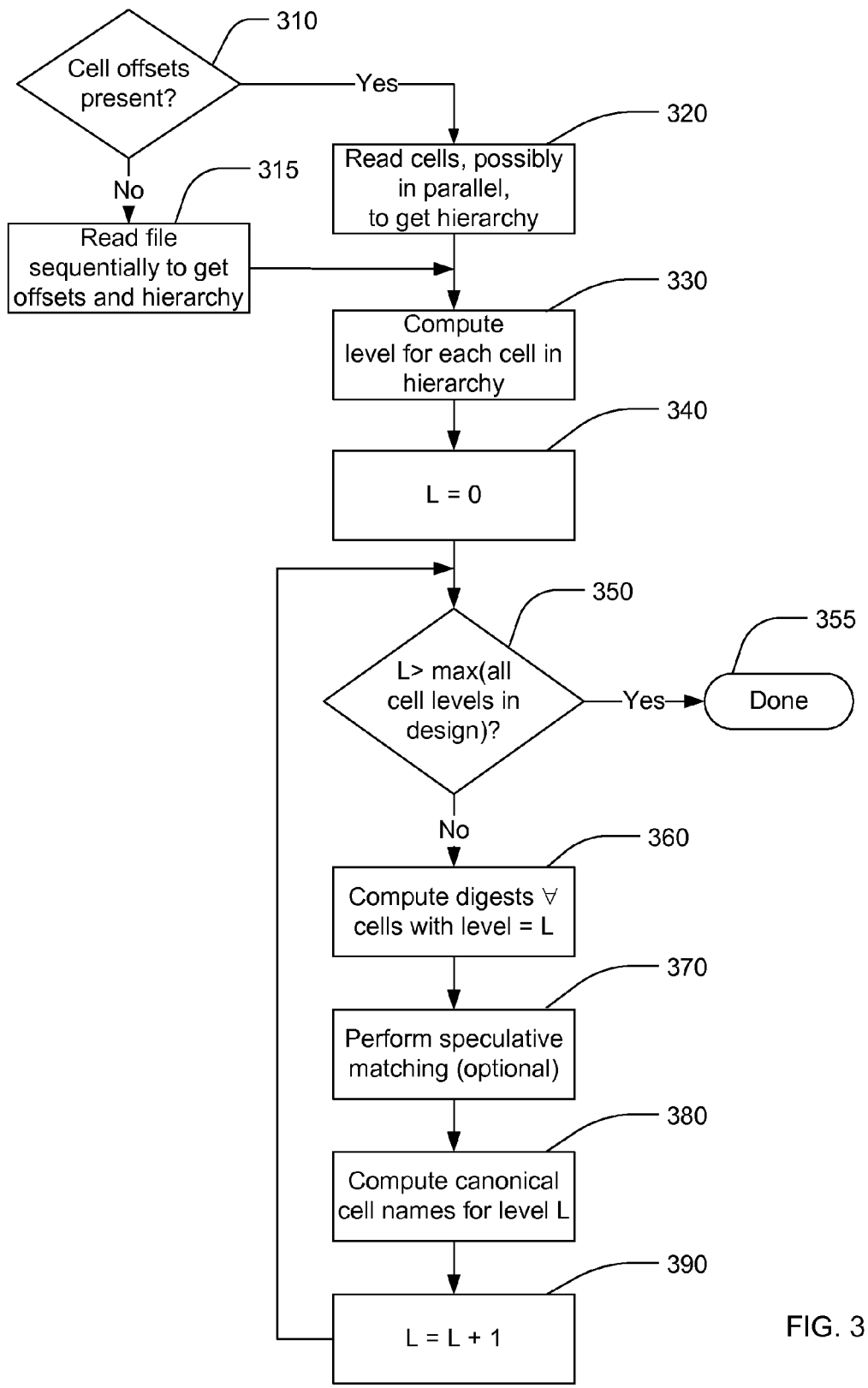
FIG. 3 is a flowchart of canonical digest computation.

Referring to FIG. 3, a similar approach applies to second and subsequent levels of the hierarchical design as analysis proceeds upward through the hierarchy. Once matches between leaf cells and first-level hierarchical cells have been found and unique names applied, it is possible to match second-level hierarchical cells that contain only references to leaf cells and first-level hierarchical cells. Then, the unique matching of names can be applied to functionally matching third-level hierarchical cells. This process can be repeated all the way up through the design hierarchy until no more matches are found or it can be limited to a selected number of levels of propagation.

With random access to cells in a design file, the process described can be performed in two passes through the design file: one pass to determine the design hierarchy 330, identify leaf cells, and compute their digests 340, 360; and one pass to compute digests of hierarchical cells 360, one level at a time 390 up to the highest levels of the design hierarchy 350, 355. This is possible because a design hierarchy is a mathematical graph with no loops (also known as a tree)—it is illegal to have a cell reference itself, either directly or indirectly. Thus, each cell in the design hierarchy can be processed exactly once after leaf cells have been renamed and dependencies determined.

Computation of the design hierarchy typically involves the design file being read all the way through 315, 320. For each cell in the design file, the names of all cells that it references are recorded. Once all cells are known, the hierarchy is assembled by adding links from all referencing cells to the referenced cells 315, 320. While reading the file, it is possible that a hierarchical cell references a cell not yet seen (a forward reference) because design file formats generally do not require a specific cell ordering, so it is not possible to guarantee that the links can be created at this time. Once reading has been completed, a self-contained (and thus valid for production) design file will have all referenced cells present.

Initial digests for all cells in a design, in particular the leaf cells, can be computed as the file is read, so the additional cost of hierarchy construction is minimal.

Calculation of digests for hierarchical cells in the second pass is also suitable for parallel processing because cells that do not reference each other in the design hierarchy will have digests that are independent of each other. The processing order can be computed using so-called partial ordering or levelization algorithms.

Once the design hierarchy is known, the leaf cells can, optionally, be processed in parallel; after all leaf cells have been processed, the first level hierarchical cells can be processed in parallel. After all first-level hierarchical cells have been processed, the second-level cells can be processed, and so on 350-390. Additional parallel processing optimizations are possible when independence between cells on different hierarchical levels can be proven using methods known to those skilled in the art.

Figure 2:
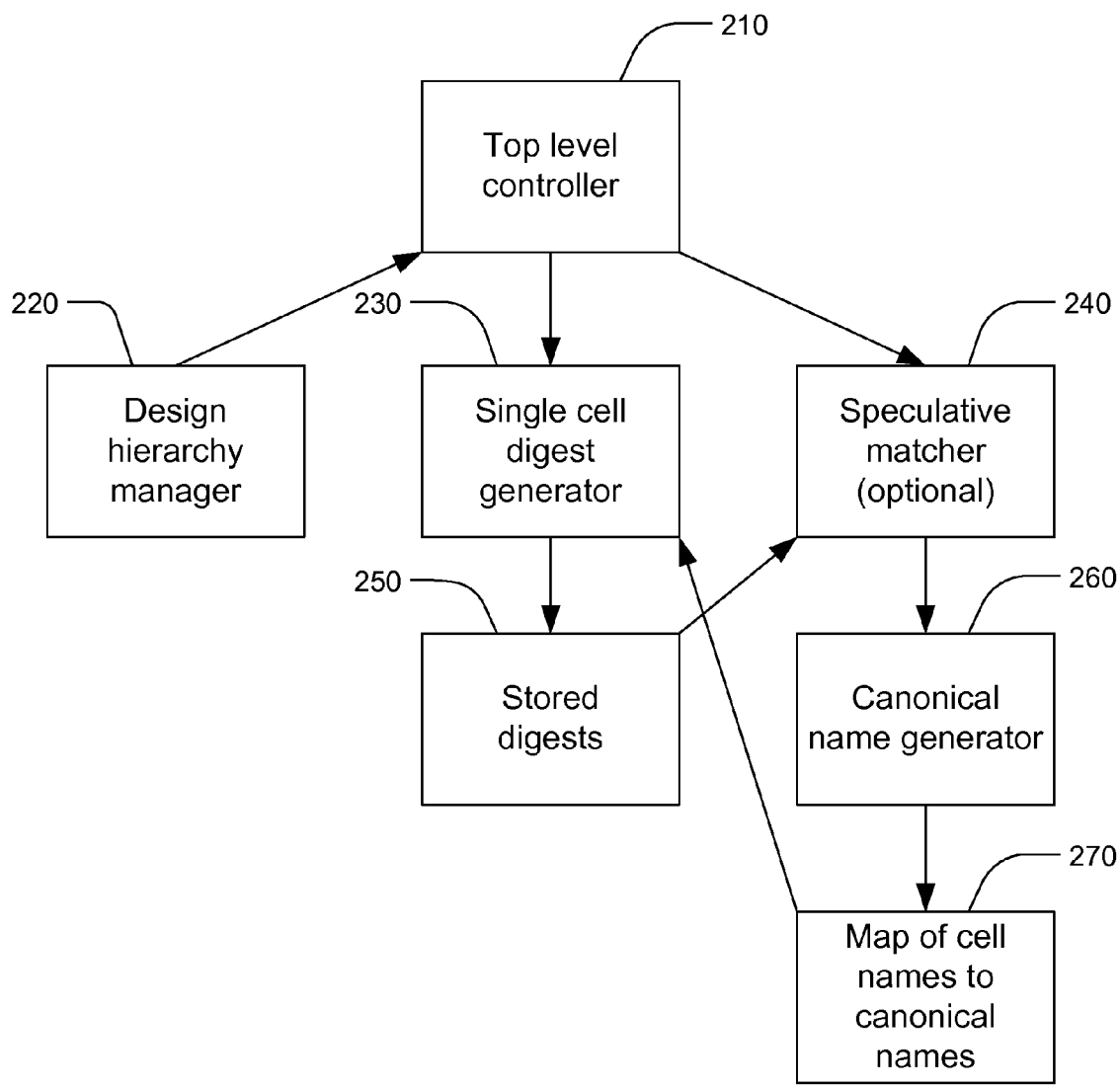
FIG. 2 is a system block diagram, by way of example; other system configurations are possible. The direction of arrows represents data or control flow.

FIG. 2 is a system block diagram, by way of example; other system configurations are possible. The direction of the arrows represents data or control flow. A top-level controller 210 controls flow among a design hierarchy manager 220, single cell digest generator 230 and speculative matcher 240. The design hierarchy manager 220 handles dependency chains. The single cell digest generator 230 handles generation of digests for single cells. Calculated digests are stored as stored digests 250. Optionally, a speculative matcher 240 identifies cells that are likely to be or that appear to be modifications of one another. A canonical name generator 260 generates unique names for cells. A map of original cell names to canonical names 270 can be used to assist with matching and to allow identification of cells given matching names. The map of cell names 270 can be combined with an indicator of speculative matching. In other system implementations, a cell matching technology other than digests could be applied and the system modified accordingly.

If the first processing pass is used solely to compute the design hierarchy, leaf cell digest computation can be performed by a separate process operating in parallel with determining dependency chains. This may be more efficient than computing leaf cell digests in line with computing the design hierarchy, as very little processing is required to determine the design hierarchy and dependency chains. Hierarchy determination can be processed sequentially, especially when offsets to cells in the design file are not known in advance 310, 315. If offsets to cells are not known in advance, the file can be scanned to identify locations of the cells within the file, especially for binary files.

In order to match hierarchical cells in a design against stored digests, the names of the lower-level cells in the design can be matched to lower-level cells used to compute the stored digests. Because there may be multiple copies of lower-level cells in the design or multiple copies of lower-level stored cell digests, there is not always a unique name to select. It is possible that multiple unrelated cells in the stored digests will have the same original name.

One implementation of the technology disclosed includes (1) the matching of the stored digests for one hierarchical block at a time; (2) the assigning of names to all matching leaf cells based on the stored names used for that hierarchical block, (3) the computing of digests for the first-level hierarchical cells in the design which reference these cells. Processing can continue for any first-level hierarchical cells in the design that still match one or more cells in the stored digests. This works best when it is known which hierarchical blocks should be in a design file. The generated unique cell names chosen do not match any other cell names within the hierarchical design or the stored digests.

Another implementation includes the assigning of a unique name to every cell when computing stored digests, basing the name at least in part on the digests themselves. Digests for stored blocks can be computed in a bottom-up fashion as well. Names are unique so that there are no false name matches between cells that are not equivalent. For example, the assigned cell name could be the concatenation of all digests of functional data. Optionally, cell names or other identifying marks can be used as part of the name or as a metadata field accompanying the name. Generating names in this fashion applies to names used in stored or reference digests. Computing stored digests in the way described allows matching or identification of hierarchical blocks without advance knowledge of which hierarchical blocks are expected to be present.

If unique names are assigned using digest information, copies of hierarchical blocks within a design file can be identified easily. For example, if there are two copies of a hierarchical block, all of the leaf cells will be assigned identical names, and when digests for the first level hierarchical cells are computed, they will also be the same. The assigned names for the first level hierarchical cells will then be the same, and so on.

This use of assigned unique names allows matching of hierarchical blocks using stored digests even when the design data (e.g., a library of circuits) used to create those digests is no longer easily available. It is common practice to remove old versions of intellectual property from computer systems to avoid using them after they have been made obsolete. If the stored digests use cell names that happen to correspond to functionally different cells in the design being verified (also known as the "candidate design"), the cells in the candidate design can be renamed for comparison purposes. However, this may lead to naming conflicts as the renaming process attempts to create names not already in the design and yet still match names in the stored digests.

The use of a unique cell name that has been assigned from a collection of digests for a given cell can be seen as equivalent to the use of a single digest that is long enough to be unique for all intents and purposes. If a single 32- or 64-bit digest is generated for a cell, there is a small but finite possibility of a false match if there are enough cells in the available libraries. The false match is related to the famous "birthday problem," which computes the probability of two students in a classroom having the same birthday.

If this unique name is generated in a specified fashion such that the text for the name can be separated into its component digests, there is no need to store all of the digests for the cell separately. This can reduce the size of a database that stores the digest. Digests of non-functional portions of the cell would still have to be stored, however. These would include digests generated from (for example) cell version strings and other labels. If the digests for non-functional portions were included in the generated name, digests for hierarchical cells referencing the name could change even if there were no functional changes in the hierarchical block.

Alternatively, the assigned unique names can be constructed as needed from the stored digests. This will generate consistent names as long as the stored digests for the cell and the method used to construct a unique name for that cell never changes. This need not require a lot of computation time; the assigned unique names can be cached so that they need not be computed more than once per program run.

Assigned unique names that use digests from the cell should have some mechanism for distinguishing the types of digests within the names. Otherwise false matches are possible (although extremely rare) when, for example, if a cell body digest in one cell were to match a cell interface in another cell. One way to distinguish digest types is to separate the components of the unique name with characters that cannot be used in layer names, cell names, or digests. In many design environments, the newline character (decimal value 10) is not valid as part of a layer or cell name, and it will not be used as part of a digest if the digest is printed as a string representation of a base-10 (decimal) or base-16 (hexadecimal) number.

A representative encoding for assigned unique names is:
interface\nlayer1\ndigest1\nlayer2\ndigest2\fbody\nlayer3 \ndigest3\nlayer4\ndigest4

Another representative encoding for assigned unique names could be:
layer1digest\nlayer2digest\nlayer3digest\nlayer4digest Here underlined text is literal. "\n" represents a newline character (decimal value 10 in the ASCII character set) and "\f" represents a form feed character (decimal value 12 in the ASCII character set). Text not underlined is variable. Optionally, interface and body layers can be separated by one or more literals, such as "interface" and "body". The layers can be string representations of layer numbers (e.g., "42") or copies of layer name text, and the digests can be string representations of digests. If layers are ordered consistently, the layer numbers could be omitted. Alternatively, layer digests can be sorted in a cell name, to uniquely order the digests without dependence on layer naming or ordering.

This sample signature has some cell interface digests and some cell body digests. If there were no cell body digests for this cell, the form feed and everything after it would be omitted. If there were no cell interface digests for this cell, everything up to and including the form feed would be omitted.

In some implementations, non-layer digests are marked with a layer number of −1 or a zero-length string when layer names are used. Thus there may be two newline characters in a row if a digest were present for non-layer data such as cell references.

One skilled in the art can see that other encodings for assigned unique names are possible. This example is not meant to be limiting.

Hierarchical Matching Process Using Digests

Referring to FIG. 1, consider a design or library file containing the following cells:
A0, B0, C0, D0, E0, F0, and G0 are leaf cells, referencing no other cells
H1 references cells A0, B0, and C0
I1 references cells D0 and E0
J2 references cells H1 and F0
K3 references cells J2, I1, and G0

Using the nomenclature described above, cells H1 and I1 are first-level hierarchical cells because they reference only leaf cells. Cell J2 is a second-level hierarchical cell because it references a first-level hierarchical cell (H1) in addition to referencing a leaf cell (F0). Cell K3 is a third-level hierarchical cell because it references a second-level hierarchical cell (J2) in addition to a first-level hierarchical cell (I1) and a leaf cell (G0). The hierarchical level of a cell is one more than the maximum hierarchical level of all of the cells that it references.

To match a hierarchical cell in a design file with a hierarchical cell in a library using stored digests, the names of referenced cells in the design file are matched to the names of equivalent cells in the library using stored digests. Thus, it can be efficient to generate the digests for a hierarchical cell in the design file after the digests for all of the cells that it references are generated.

One serial implementation would compute the digests for all leaf cells, perform matches with library cells using the digests, and assign new names to the matched leaf cells to be used during the matching process. It would then compute the digests for all first-level hierarchical cells, perform matches with library cells using the digests, and assign new names to the matched first-level hierarchical cells to be used during the matching process. Matching of second-level hierarchical cells would proceed in the same manner, followed by matching of third-level hierarchical cells etc. until no more levels of hierarchy could be matched.

Some parallelism is possible. The digests for all leaf cells can be generated in parallel because by definition they do not reference any other cells. The digests for all first-level hierarchical cells can be generated in parallel once the digests for all leaf cells have been generated. They can be generated because, by definition, no first-level hierarchical cell references any other first-level hierarchical cell. The digests for all second-level cells can be generated in parallel once the digests for all first-level hierarchical cells are generated, and so on.

Generally speaking, there will be fewer cells at higher levels of hierarchy, until there is one cell at the very top of the hierarchy that represents the entire design or hierarchical library block. The number of cells available for parallel processing is reduced at successive levels.

If dependencies in the design hierarchy has been calculated or at least partially calculated, analysis of individual reference lists or dependency chains can allow digests for some higher-level hierarchical cells to be computed before all of the digests for cells of lower levels are completed. This analysis would use dependency graphs or other methods known to one skilled in the art.

When computing digests in parallel, the list of assigned unique names is updated in a safe manner. If digests are computed on a level-by-level basis as described above, it is sufficient to update the list of assigned unique names once per level, after the processing for the level is completed. Because the list is not being read for digest computation at this time, it is safe to add new unique names without expensive locking mechanisms or coherency algorithms.

If a given cell in a design file cannot be matched against any cell in the stored library, a difference has been found. Matching can halt here and the differences at this level of the hierarchy can be reported, along with all levels of hierarchy above. Alternatively, if a comparison algorithm determines that a cell in the design file with differing digests is likely a modified copy of a cell in the stored library, a matching name can be assigned to the cell speculatively (as if a match were found) and the matching process continued to determine whether the difference is restricted to that cell only. This would allow matching of hierarchical IP blocks for payment of royalties for example, even if one or more lower-level cells have been modified.

The same issues apply when comparing two hierarchical design files to each other using digests. One skilled in the art would see that the library file could instead be a first design file to be compared with a second design file.

One issue when comparing designs using assigned cell unique names is that the digests for higher-level hierarchical cells will be different than if no unique names are assigned to cells. When comparing one design or library to another design or library, better matching is possible if it is known that both sets of signatures use assigned unique names or that both sets of signatures use the original names. Thus, it is advantageous to store a flag with the digests for a given cell in a database, where the flag indicates whether assigned unique names were used to compute the digests. A warning can be generated when this flag differs while comparing sets of digests.

Considerations for Hierarchical Matching in the Presence of Differences

When there are multiple digests per cell, it is possible to compute a distance metric between two cells for the purpose of determining whether one is likely to be a modified copy of the other. This is relatively straightforward for a single cell or when the goal is to report candidate matches, but when matching is being used hierarchically or to determine royalty payments for IP usage, the analysis is more complex.

Polygon layouts for leaf cells often share common elements. For example, a gate array cell library will have a small set of allowable cell widths, and the transistor well layers, diffusion layers, and polysilicon gate layers will have a standard configuration for each cell width. Thus, the digests for these layers may be the same across a range of cells. Using these digests as evidence of matching may lead to false positive matches. This can confuse the hierarchical matching, requiring extra processing time as additional speculative matches are tested or even causing false reports of royalty-based IP use.

Extra processing may be applied when a cell in a candidate design appears to be a "good" match with several library cells. In this circumstance, matching can benefit from extended evaluation of each candidate "good" match, computing digests for all of the hierarchical cells that reference it. If a trial match does not result in any matches of hierarchical referencing cells, another trial match may have to be attempted. This can increase the processing time.

Similarly, speculatively matching multiple leaf cells within a hierarchical block could create a false match between that hierarchical block and another hierarchical block that is based on a similar template. If the hierarchical blocks are royalty-based IP, an improper match may result in a higher or lower royalty rate than is appropriate.

Thus, careful consideration of evidence for speculative matching within hierarchical blocks is useful. Three heuristics to reduce false matching include:

First, look for unique digests within the candidate matched cell, i.e., digests that appear in the design cell and in the library cell to which it is to be matched, but nowhere else; the appearance of such signatures are strong evidence of a match.

Second, pass in a list of layers that may have the same digests in a range of cells, and exclude those layers when considering the number of digest matches between the candidate cell and the library cell, because they do not provide strong evidence of copying.

Third, if lower-level cells are a better match to a particular version of an IP block, the higher levels of hierarchy are likely to come from the same version. This can be used as a tie-breaker when two library versions of a cell have an equivalent number of matched layers because it will reduce the number of reports that a leaf cell came from one version while the upper level cells came from another version.

Additional heuristics are of course possible, and the heuristics can be used singly or in combination.

When reporting a hierarchical match on the basis of speculative matching of lower-level cells, it is necessary to track and report which cells were matched speculatively so that further analysis can be performed to determine what has actually changed and/or to verify that royalties are due.

Typical Usage

The technology disclosed is helpful in many ways. In some implementations, it can be used to verify whether when verify whether any warranted compiled hierarchical block of IP has changed. Or, it can be used to verify whether non-compiled but still warranted IP has changed. Or, when matching generated cells (e.g. PCells for the Cadence Virtuoso layout editor) with arbitrary names. Or, verifying whether all cells within a finished IP block are up to date. Or, when ensuring no changes in "golden" functional units that are being reused, even if they make use of some cells that should not be used otherwise. Or, when choosing names for digesting purposes when there may be multiple copies of a cell in a design. Or, when identifying duplicate copies of hierarchical blocks within a design (i.e., sets of cells appear twice in the design file, rather than one set being referenced twice as is the normal practice). Or, when performing hierarchical matching when the original design files for hierarchical blocks are no longer present. Or, when identifying where a difference occurs in a hierarchical block within a design. Or, when using speculative matching to list the differences at all levels of a hierarchical block within a design. Or, when generating assigned names "on the fly" rather than storing them.

The above disclosure describes methods of matching hierarchical cells by processing one cell at a time. The order of cells in a design file (or a library file, since both use the same file formats) is arbitrary. In particular, it is not guaranteed that cells will appear in hierarchical order, with leaf cells first, followed by first level cells, etc. to the top level of the hierarchy. Thus, a traversal in hierarchical order can benefit from random access into the file. Not all design file formats include a directory of cell offsets within a file, so they can be computed during the first pass through the design file, along with the design hierarchy and optionally digests for leaf cells. These offsets can be stored with the digests for later processing, for example if the "design file" is actually a block to be placed into a larger design later. The offsets allow efficient traversal of the data used to generate the stored digests (e.g., from a library file, if it is still available) as well as efficient traversal of the design file.

Figure 5:
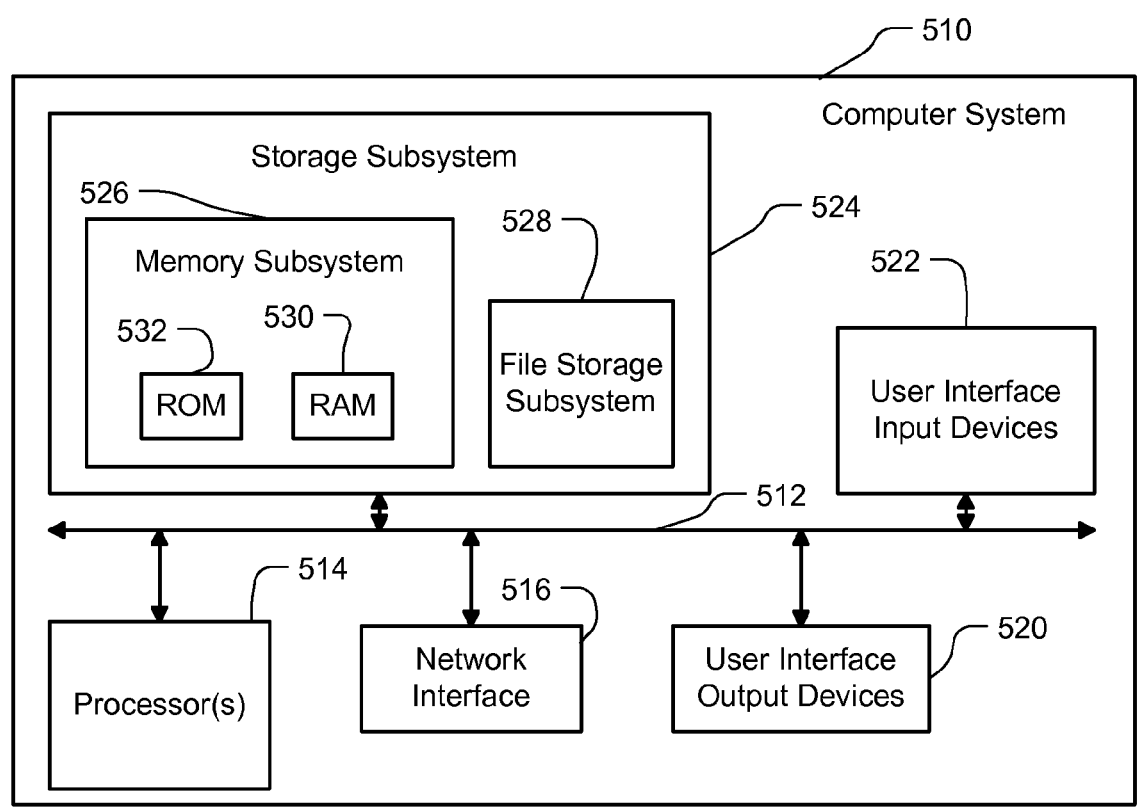
FIG. 5 is a block diagram of an example computer system, according to one implementation.

FIG. 5 is a block diagram of an example computer system, according to one implementation. Computer system 510 typically includes at least one processor 514 that communicates with a number of peripheral devices via bus subsystem 512. These peripheral devices may include a storage subsystem 524 including, for example, memory devices 526 and a file storage subsystem 528, user interface input devices 522, user interface output devices 520, and a network interface subsystem 516. The input and output devices allow user interaction with computer system 510. Network interface subsystem 516 provides an interface to outside networks, including an interface to a communication network coupled to corresponding interface devices in other computer systems.

User interface input devices 522 may include: a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 510 or onto communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules and methods described herein. These software modules are generally executed by processor 514 alone or in combination with other processors.

Memory 526 used in the storage subsystem can include a number of memories including a main random access memory (RAM) 530 for storage of instructions and data during program execution and a read only memory (ROM) 532 in which fixed instructions are stored. A file storage subsystem 528 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 528 in the storage subsystem 524, or in other machines accessible by the processor.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as one example. Many other configurations of computer system 510 are possible having more or fewer components than the computer system depicted in FIG. 5.

Particular Embodiments

The technology disclosed herein can readily be used to reduce noise generated by any of the processes described in the referenced '545 patent.

In one implementation, a method is described that includes evaluating the similarities between cells used in a hierarchical design of a circuit device. This method includes calculating digests for at least some leaf cells in the hierarchical design, using a processor, wherein the leaf cells do not contain references to other cells in the design. It further includes detecting matching leaf cells that are functionally identical using the calculated digests and assigning matching names to the matching leaf cells to replace original, non-matching names of the matching leaf cells. The matching names are propagated to higher-level cells in the hierarchical design in place of the original names of the matching leaf cells. The method further includes calculating digests for at least some of the higher level cells after the propagating of the matching names into the higher level cells. While this implementation uses digests, another implementation described below more generally uses any cell matching technology.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. This method implementation also can be combined with the additional implementation described below, forming methods with both digests and dependency chains. The reader will understand how features identified in this section can readily be combined with sets of base features identified as implementations.

The method can further include applying the calculating, detecting, assigning and propagating steps to first-level cells in the hierarchical design. This can include detecting matching first-level cells that are functionally identical using the calculated digests, wherein the first-level cells contain references to leaf cells but not higher level cells in the design. It can further include assigning matching names to the matching first-level cells to replace original, non-matching names of the matching first-level cells, and propagating the matching names to higher level cells in the hierarchical design in place of the original names of the matching first-level cells.

Similarly, the method can include applying the calculating, detecting, assigning and propagating steps to at least some second-level, third-level and subsequent-level cells in the hierarchical design, thereby propagating the matching names of matching cells at lower levels in the hierarchy into cells at higher levels in the hierarchy.

At any level, the method can be extended to include speculative matching of leaf cells. This extension can include calculating multiple digests for at least some leaf cells, wherein the multiple digests apply to multiple layers of the leaf cells. It can further include detecting leaf cells that appear to be modified counterparts of one another using the multiple calculated digests for the leaf cells, and optionally storing a counterpart indicator with the multiple calculated digests for the leaf cells. It can further include assigning matching names to the modified counterpart leaf cells to replace original, non-matching names of the modified counterpart leaf cells, before the propagating of the matching names.

The speculative matching can be extended to first-level cells, including calculating multiple digests for at least some first-level cells, wherein the multiple digests apply to multiple layers of the first-level cells and detecting first-level cells that appear to be modified counterparts of one another using the multiple calculated digests for the first-level cells. It can further include a counterpart indicator for the modified counterpart first-level cells and assigning matching names to the modified counterpart first-level cells to replace original, non-matching names of the modified counterpart first-level cells, before the propagating of the matching names.

Similarly, at least the applying, calculating, detecting, and assigning steps can be extended to detect modified counterpart cells to at least some second-level, third-level and subsequent-level cells in the hierarchical design, thereby propagating the matching names of modified counterpart cells at lower levels in the hierarchy into cells at higher levels in the hierarchy.

Any method described above can, optionally, include comparing the digests in the hierarchical design to reference digests and reporting at least some results of the comparing. It also can include reporting at least some of the detected modified counterparts. The reporting can be useful whether the report is to a system for visual display to a user, is persisted for later processing or review by a user, or is passed to another computer implemented process for further processing.

Other implementations may include a non-transitory computer readable storage medium storing instructions executable by a processor to perform a method as described above. Yet another implementation may include a system including memory and one or more processors operable to execute instructions, stored in the memory, to perform a method as described above. Another implementation includes a non-transitory computer readable storage medium storing instructions executable by a processor that, when loaded onto a computer system, configure the computer system to perform a method as described above.

In another implementation, a method is described of analyzing cells in a hierarchical design of a circuit device for functional similarity. This method includes analyzing the hierarchical design using a processor to determine dependency chains from leaf cells that do not reference any other cells in the hierarchical design upward to higher levels in the hierarchical design, wherein n–level cells, by definition, are limited to referencing leaf cells through n–1 level cells and not referencing n–level or n+level cells. It further includes detecting matching leaf cells, assigning matching names to the matching leaf cells, and propagating the matching names to higher-level cells in the hierarchical design in place of the original, non-matching names of the matching leaf cells. It can include applying the detecting, assigning and propagating steps to at least some first-level, second-level, third-level, and subsequent-level cells along the dependency chains, and evaluating functional similarity of at least some of the n–level cells above the leaf cells in the hierarchical design after propagating the matching names into the n–level cells along the dependency chains.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

This method can be extended to include speculative matching of cells, including detecting leaf cells that appear to be modified counterparts of one another, optionally storing a counterpart indicator for the leaf cells, and assigning matching names to the modified counterpart leaf cells to replace original, non-matching names of the modified counterpart leaf cells, before the propagating of the matching names. This method can further include applying at least the detecting, assigning and propagating steps for modified counterparts to at least some first-level, second-level, third-level and subsequent-level cells along the dependency chains, and evaluating functional similarity of at least some of the n–level cells above the leaf cells in the hierarchical design after propagating the matching names into the higher-level cells along the dependency chains.

These methods can further include comparing at least some features of the cells in the hierarchical design to features of reference cells and reporting at least some results of the comparing. And, it can further include reporting at least some of the detected modified counterparts.

Other implementations may include a non-transitory computer readable storage medium storing instructions executable by a processor to perform a method as described above. Yet another implementation may include a system including memory and one or more processors operable to execute instructions, stored in the memory, to perform a method as described above. Another implementation includes a non-transitory computer readable storage medium storing instructions executable by a processor that, when loaded onto a computer system, configure the computer system to perform a method as described above.

I claim:

1. A computer-implemented method of evaluating similarity of cells used in a hierarchical design of a circuit device, the method including:
    calculating digests for at least some leaf cells in the hierarchical design, using a processor, wherein the leaf cells do not contain references to other cells in the design;
    detecting matching leaf cells that have functionally identical designs using the calculated digests;
    assigning matching names to the matching leaf cells to replace original, non-matching names of the matching leaf cells;
    propagating the matching names to higher level cells in the hierarchical design in place of the original names of the matching leaf cells; and
    calculating digests for at least some of the higher level cells after the propagating of the matching names into the higher level cells.

2. The method of claim 1, further including applying the calculating, detecting, assigning and propagating steps to first-level cells in the hierarchical design, including:
    detecting matching first-level cells that have functionally identical designs using the calculated digests, wherein the first-level cells contain references to leaf cells but not higher level cells in the design;
    assigning matching names to the matching first-level cells to replace original, non-matching names of the matching first-level cells; and
    propagating the matching names to higher level cells in the hierarchical design in place of the original names of the matching first-level cells.

3. The method of claim 2, further including applying the calculating, detecting, assigning and propagating steps to at least some second-level, third-level and subsequent-level cells in the hierarchical design, thereby propagating the matching names of matching cells at lower levels in the hierarchy into cells at higher levels in the hierarchy.

4. The method of claim 1 further including speculative matching of leaf cells, including:
    calculating multiple digests for at least some leaf cells, wherein the multiple digests apply to multiple layers of the leaf cells;

detecting leaf cells that appear to be modified counterparts of one another using the multiple calculated digests for the leaf cells; and assigning matching names to the modified counterpart leaf cells to replace original, non-matching names of the modified counterpart leaf cells, before the propagating of the matching names.

5. The method of claim 4, further including storing a counterpart indicator with the multiple calculated digests for the leaf cells of the modified counterpart first-level cells.

6. The method of claim 4, further including speculative matching of first-level cells, including:

calculating multiple digests for at least some first-level cells, wherein the multiple digests apply to multiple layers of the first-level cells;

detecting first-level cells that appear to be modified counterparts of one another using the multiple calculated digests for the first-level cells; and assigning matching names to the modified counterpart first-level cells to replace original, non-matching names of the modified counterpart first-level cells, before the propagating of the matching names.

7. The method of claim 6, further including applying at least the calculating, detecting, and assigning steps to detect modified counterpart cells to at least some second-level, third-level and subsequent-level cells in the hierarchical design, thereby propagating the matching names of modified counterpart cells at lower levels in the hierarchy into cells at higher levels in the hierarchy.

8. The method of claim 1, further including comparing the digests in the hierarchical design to reference digests and reporting at least some results of the comparing.

9. The method of claim 4, further including reporting at least some of the detected modified counterparts.

10. A computer-implemented method of analyzing cells in a hierarchical design of a circuit device for functional similarity, the method including:

analyzing the hierarchical design using a processor to determine dependency chains from leaf cells that do not reference any other cells in the hierarchical design upward to higher levels in the hierarchical design, wherein n–level cells, by definition, are limited to referencing leaf cells through n–1 level cells and not referencing n–level or n+level cells;

detecting matching leaf cells by comparing digests of at least portions of the leaf cells, assigning matching names to the matching leaf cells, and propagating the matching names to higher level cells in the hierarchical design in place of the original, non-matching names of the matching leaf cells;

applying the detecting, assigning and propagating steps to at least some first-level, second-level, third-level, and subsequent-level cells along the dependency chains; and evaluating functional similarity of at least some of the n-level cells above the leaf cells in the hierarchical design after propagating the matching names into the n–level cells along the dependency chains.

11. The method of claim 10, further including speculative matching of cells, including:

detecting leaf cells that appear to be modified counterparts of one another and assigning matching names to the modified counterpart leaf cells to replace original, non-matching names of the modified counterpart leaf cells, before the propagating of the matching names;

applying the detecting, assigning and propagating steps for modified counterparts to at least some first-level, second-level, third-level and subsequent-level cells along the dependency chains; and evaluating functional similarity of at least some of the n-level cells above the leaf cells in the hierarchical design after propagating the matching names into the higher-level cells along the dependency chains.

12. The method claim 10, further including comparing at least some features of the cells in the hierarchical design to features of reference cells and reporting at least some results of the comparing.

13. The method of 11 further including reporting at least some of the detected modified counterparts.

14. A computer-readable storage medium storing computer program instructions that, when executed on a processor, carry out actions including:

calculating digests for at least some leaf cells in the hierarchical design, using a processor, wherein the leaf cells do not contain references to other cells in the design;

detecting matching leaf cells that have functionally identical designs using the calculated digests;

assigning matching names to the matching leaf cells to replace original, non-matching names of the matching leaf cells;

propagating the matching names to higher level cells in the hierarchical design in place of the original names of the matching leaf cells; and calculating digests for at least some of the higher level cells after the propagating of the matching names into the higher level cells.

15. The computer-readable storage medium of claim 14, further including program instructions to carry out including speculative matching of leaf cells, including:

calculating multiple digests for at least some leaf cells, wherein the multiple digests apply to multiple layers of the leaf cells;

detecting leaf cells that appear to be modified counterparts of one another using the multiple calculated digests for the leaf cells; and assigning matching names to the modified counterpart leaf cells to replace original, non-matching names of the modified counterpart leaf cells, before the propagating of the matching names.

16. A computer-readable storage medium storing computer program instructions that, when executed on a processor, carry out actions including:

analyzing the hierarchical design using a processor to determine dependency chains from leaf cells that do not reference any other cells in the hierarchical design upward to higher levels in the hierarchical design, wherein n-level cells, by definition, are limited to referencing leaf cells through n–1 level cells and not referencing n–level or n+level cells;

detecting matching leaf cells, assigning matching names to the matching leaf cells by comparing digests of at least portions of the leaf cells, and propagating the matching names to higher level cells in the hierarchical design in place of the original, non-matching names of the matching leaf cells;

applying the detecting, assigning and propagating steps to at least some first-level, second-level, third-level, and subsequent-level cells along the dependency chains; and evaluating functional similarity of at least some of the n-level cells above the leaf cells in the hierarchical design after propagating the matching names into the n–level cells along the dependency chains.

17. The computer-readable storage medium of claim 16, further including program instructions to carry out speculative matching of cells, including:

- detecting leaf cells that appear to be modified counterparts of one another by comparing digests of at least portions of the leaf cells and assigning matching names to the modified counterpart leaf cells to replace original, non-matching names of the modified counterpart leaf cells, before the propagating of the matching names;
- applying the detecting, assigning and propagating steps for modified counterparts to at least some first-level, second-level, third-level and subsequent-level cells along the dependency chains; and
- evaluating functional similarity of at least some of the n-level cells above the leaf cells in the hierarchical design after propagating the matching names into the higher-level cells along the dependency chains.

18. A computer system including:

a processor; and a computer-readable storage medium storing computer program instructions that, when executed on the processor, carry out actions including:

- calculating digests for at least some leaf cells in the hierarchical design, using a processor, wherein the leaf cells do not contain references to other cells in the design;
- detecting matching leaf cells that have functionally identical designs using the calculated digests;
- assigning matching names to the matching leaf cells to replace original, non-matching names of the matching leaf cells;
- propagating the matching names to higher level cells in the hierarchical design in place of the original names of the matching leaf cells; and
- calculating digests for at least some of the higher level cells after the propagating of the matching names into the higher level cells.

19. The computer system of claim 18, further program instructions to carry out including speculative matching of leaf cells, including:

- calculating multiple digests for at least some leaf cells, wherein the multiple digests apply to multiple layers of the leaf cells;
- detecting leaf cells that appear to be modified counterparts of one another using the multiple calculated digests for the leaf cells; and
- assigning matching names to the modified counterpart leaf cells to replace original, non-matching names of the modified counterpart leaf cells, before the propagating of the matching names.

20. A computer system including:

a processor; and a computer-readable storage medium storing computer program instructions that, when executed on the processor, carry out actions including:

- analyzing the hierarchical design using a processor to determine dependency chains from leaf cells that do not reference any other cells in the hierarchical design upward to higher levels in the hierarchical design, wherein n-level cells, by definition, are limited to referencing leaf cells through n−1 level cells and not referencing n−level or n+level cells;
- detecting matching leaf cells by comparing digests of at least portions of the leaf cells, assigning matching names to the matching leaf cells, and propagating the matching names to higher level cells in the hierarchical design in place of the original, non-matching names of the matching leaf cells;
- applying the detecting, assigning and propagating steps to at least some first-level, second-level, third-level, and subsequent-level cells along the dependency chains; and
- evaluating functional similarity of at least some of the n-level cells above the leaf cells in the hierarchical design after propagating the matching names into the n−level cells along the dependency chains.

21. The computer system of claim 20, further including program instructions to carry out speculative matching of cells, including:

- detecting leaf cells that appear to be modified counterparts of one another and assigning matching names to the modified counterpart leaf cells to replace original, non-matching names of the modified counterpart leaf cells, before the propagating of the matching names;
- applying the detecting, assigning and propagating steps for modified counterparts to at least some first-level, second-level, third-level and subsequent-level cells along the dependency chains; and
- evaluating functional similarity of at least some of the n-level cells above the leaf cells in the hierarchical design after propagating the matching names into the higher-level cells along the dependency chains.

* * * * *